(12) United States Patent
Jaulin et al.

(10) Patent No.: US 10,492,089 B2
(45) Date of Patent: Nov. 26, 2019

(54) METHOD FOR TESTING A RADIO COMMUNICATION DEVICE TO BE TESTED OF A GATEWAY IN A SET OF GATEWAYS

(71) Applicant: SAGEMCOM BROADBAND SAS, Rueil Malmaison (FR)

(72) Inventors: Jean-Philippe Jaulin, Rueil Malmaison (FR); Nicolas Dangy-Caye, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 15/544,683

(22) PCT Filed: Jan. 25, 2016

(86) PCT No.: PCT/EP2016/051423
§ 371 (c)(1),
(2) Date: Jul. 19, 2017

(87) PCT Pub. No.: WO2016/120194
PCT Pub. Date: Aug. 4, 2016

(65) Prior Publication Data
US 2018/0288633 A1 Oct. 4, 2018

(30) Foreign Application Priority Data
Jan. 27, 2015 (FR) ..................................... 15 50589

(51) Int. Cl.
*G01R 31/08* (2006.01)
*H04W 24/04* (2009.01)
(Continued)

(52) U.S. Cl.
CPC ......... *H04W 24/04* (2013.01); *H04L 12/6418* (2013.01); *H04L 43/0817* (2013.01); *H04W 88/16* (2013.01)

(58) Field of Classification Search
CPC .... H04W 24/04; H04W 88/16; H04L 43/0817
See application file for complete search history.

(56) References Cited

U.S. PATENT DOCUMENTS

| 8,280,442 B2 | 10/2012 | Nakano et al. |
| 2007/0050240 A1 | 3/2007 | Belani et al. |

(Continued)

FOREIGN PATENT DOCUMENTS

| GB | 2482587 | 2/2012 |
| JP | 2005-328230 | 11/2005 |

(Continued)

OTHER PUBLICATIONS

International Search Report and Written Opinion of the ISA for PCT/EP2016/051423, dated Apr. 19, 2016, 11 pages.

*Primary Examiner* — Bo Hui A Zhu
(74) *Attorney, Agent, or Firm* — Nixon & Vanderhye P.C.

(57) ABSTRACT

The present invention relates to a method for testing a radio communication device to be tested of a gateway in a set of gateways. This method is characterised in that it comprises the following steps:

Figure 1:
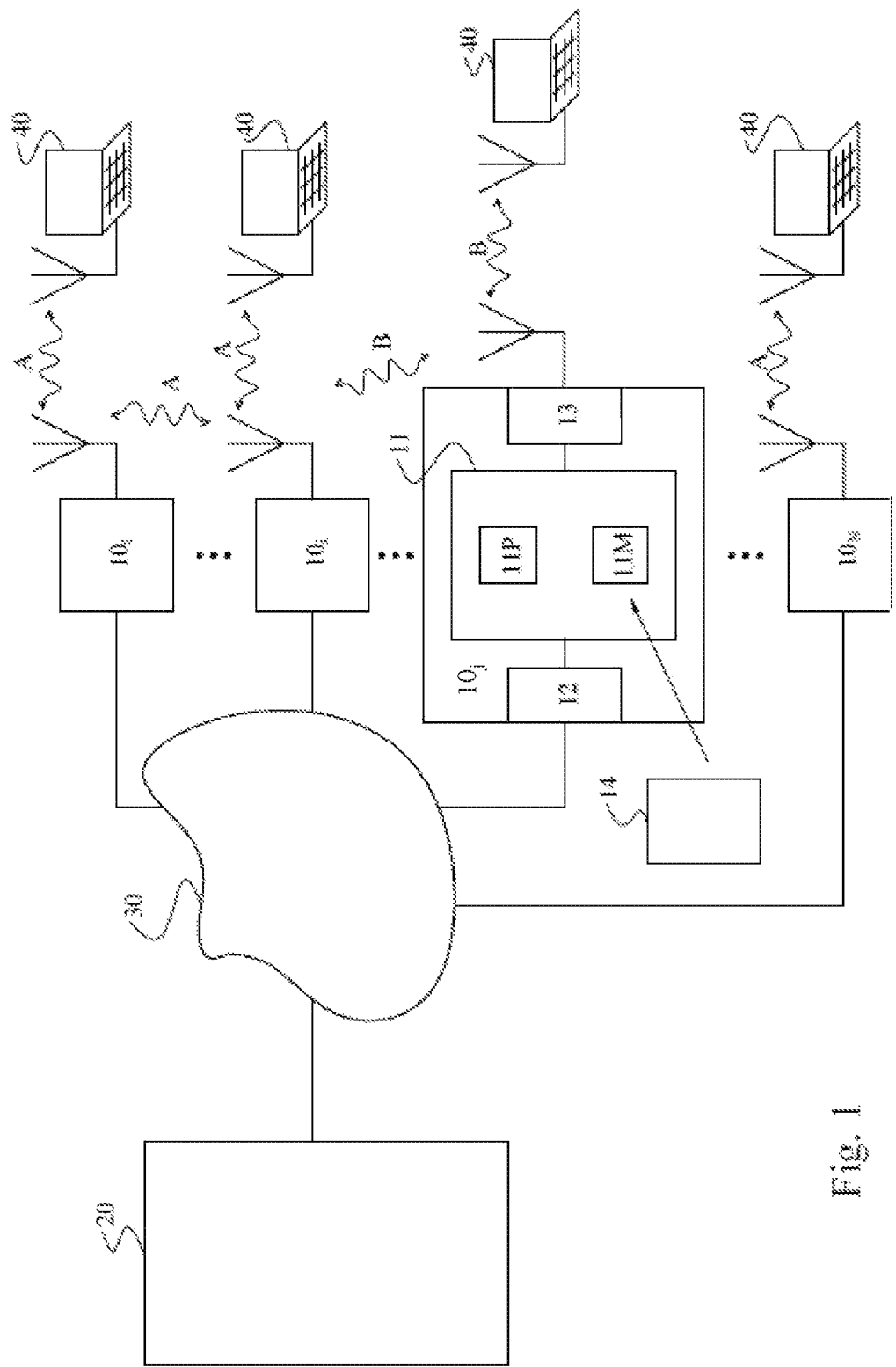

a step of transmission, by said radio communication device of said gateway to be tested, of a response-request message requesting, of every radio communication device of a gateway in said neighbouring gateway receiving said message, a response in the form of a response message,
a step of receiving any response message, and
a diagnostic step diagnosing correct functioning of said radio communication device of the gateway to be tested in the event of reception of at least one response message.

15 Claims, 5 Drawing Sheets

(51) Int. Cl.
*H04L 12/64* (2006.01)
*H04L 12/26* (2006.01)
*H04W 88/16* (2009.01)

(56) References Cited

U.S. PATENT DOCUMENTS

2009/0316628 A1   12/2009  Enns et al.
2010/0182915 A1    7/2010  Montemurro et al.

FOREIGN PATENT DOCUMENTS

WO   WO 2008/127631   10/2008
WO   WO 2013/142967   10/2013

METHOD FOR TESTING A RADIO COMMUNICATION DEVICE TO BE TESTED OF A GATEWAY IN A SET OF GATEWAYS

This application is the U.S. national phase of International Application No. PCT/EP2016/051423 filed 25 Jan. 2016, which designates the U.S. and claims priority to FR Patent Application No. 15/50589 filed 27 Jan. 2015, the entire contents of each of which are hereby incorporated by reference.

The present invention relates to a method for testing a radio communication device to be tested of a gateway in a set of gateways.

In the present patent application, gateway designates an item of equipment that forms the link between at least two separate networks, one of an extended nature WAN (wide area network), the other of a local nature of the LAN (local area network) or WLAN (wireless local area network) type. The interface of a gateway with the extended network WAN may be of the xDSL type (for example ADSL). The interface with the local network LAN considered in the present invention is wireless (WLAN), for example of the Wi-Fi type, and is provided by what is called in the present description a radio communication device.

Testing a radio communication device of a gateway that incorporates it makes it possible to determine the functional validity thereof and can be done either at the end of the production of this gateway or during use thereof by a user in order in particular to diagnose any fault. Generally, it requires the use of means external to the gateway to be tested in order to carry it out, which a user does not generally have.

Particularly in the case of many radio communication devices that can be integrated in a gateway (2.4 GHz Wi-Fi, 5 GHz Wi-Fi, Bluetooth, Zigbee, DECT, etc.), such a test is always tricky. This is because the connection between one of these radio communication devices of the gateway in question and a distant appliance, generally a test appliance, uses a plurality of interfaces:

In the gateway itself, an interface between the main processor managing the communication for the gateway in question and the radio-frequency transceiver component that is responsible for the communication, as well as a physical interface between this RF component and at least one antenna (the RF component and antennas form together the radio communication device to be tested). This physical interface may consist of a large number of passive components (filters, adaptation components, etc.) and active components (amplifiers).

An interface consisting of the air medium serving as a carrier for the propagation of the radio-frequency waves between the gateway itself and the distant appliance.

In the distant appliance, a physical interface between its antenna or antennas and a radio-frequency component responsible for the communication and an interface between this RF component and the main processor managing the communication for the distant appliance.

In addition, establishing a communication between the gateway to be tested and a distant appliance requires the use of radio-communication protocols particular to each of the technologies used in the radio-communication devices. Depending on the technology used, it may be necessary to use keys (WEP, WPA, etc. in the case of the Wi-Fi standard, PIN code in the case of the Bluetooth standard, etc.), protections of the access-rights or authorised MAC address list type, or the like.

The main controller of a gateway, because it establishes a logic dialogue with the RF transceiver component and itself, is able to know the state of the interface between them. The diagnosis of the radio communication device overall (RF component+antennas) therefore amounts to diagnosing the functioning of the RF component and that of its interface with the antenna or antennas of the gateway.

Several known methods are at the present time used to carry out a diagnosis of a radio communication device.

According to a particular method, the separate test is carried out on the transmission chain and the reception chain by means of one or more external test appliances. This type of test is widely used during manufacture or debugging phases, and requires the use of specialised equipment.

To check the functioning of the transmission chain, the gateway to be tested is placed in a so-called "transmission test" mode in which its radio communication device transmits a particular known test signal. A distant measuring appliance of the analyser type then receives the test signal normally transmitted by the gateway, analyses it and gives the characteristics thereof. The difference between the result obtained and the expected result can give the technician information about the behaviour of the transmission chain.

In the same way, to check the functioning of the reception chain, a distant measuring appliance of the generator type transmits a particular known test signal to the radio communication device of the gateway. The gateway is placed in a so-called "reception test" mode in which its radio communication device returns a signal reflecting the signal that it receives. The difference between the result obtained and the expected result can give information to the technician about the behaviour of the reception chain.

This type of test makes it possible to characterise the transmission and reception chains independently while disregarding the communication protocol used. It is entirely suited to debugging but, because of the need to use complex external equipment, cannot be used for diagnosis purposes on the site at a non-technician user.

Another method is a method for diagnosing the transmission chain by means of a radio-field detector. This basic method, widely known to persons skilled in the art, consists of measuring the field emitted by a transmission chain by means of a radio-field detector connected to a measuring antenna. This type of measurement gives good information on the signal level actual transmitted by the antenna, and therefore on the good state of the whole of the transmission chain. Nevertheless, this method does not make it possible to characterise the performance of the reception chain.

Another method is the diagnosis of the reception chain by means of a test-signal generator. Such a method is in particular described in the patent U.S. Pat. No. 8,280,442 and consists of evaluating the effects of a particular signal injected into the reception chain and thus to characterise its performance. This method also does not make it possible to characterise the performance of the transmission chain.

In addition, these last methods require the use of components the only function of which is to provide this diagnosis, which therefore gives rise to an additional cost with regard to the equipment.

The aim of the present invention is to propose a method for diagnosing a radio communication device of a gateway that solves the problems posed by the diagnostic methods of the prior art that have just been briefly described.

To this end, the present invention relates to a method for testing a radio communication device of a gateway to be tested in a set of gateways. It is characterised in that it comprises the following steps:

a step of transmission, by said radio communication device of said gateway to be tested, of a response-request message requesting, of every radio communication device of a gateway in said neighbouring gateway that received said message, a response in the form of a response message, a step of receiving any response message, and a diagnostic step diagnosing correct functioning of said radio communication device of the gateway to be tested in the event of reception of at least one response message.

According to an advantageous feature, said response-request message asks that only neighbouring gateways having particular communication characteristics should respond thereto.

According to an advantageous feature, said diagnostic step diagnoses a possible malfunctioning of said radio communication device of the gateway to be tested in the case of absence of reception of a response message.

According to an advantageous feature, said gateway to be tested is connected to a system managing said set of gateways, said method then being characterised in that it comprises:

a step, implemented by said gateway to be tested, of transmitting a control message to said management system, and a step, implemented by said management system on reception of said control message, of activating at least one radio communication device of a neighbouring gateway in said set that is estimated to be at a geographical distance from said gateway to be tested less than a predetermined distance, if such a gateway exists.

According to an advantageous feature, said transmission step is implemented in the case of absence of reception of a response message at the diagnostic step, said transmission step, said reception step and said diagnostic step being once again implemented by said radio communication device of the gateway to be tested on reception of a message acknowledging that the activation step has been implemented.

According to an advantageous feature, said method also comprises:

a step, implemented by said management system in the case where no gateway in said set is at an estimated geographical distance from said gateway to be tested less than a predetermined distance, of transmitting a warning message to said gateway to be tested, and a step, implemented by said gateway to be tested on reception of said warning message, of diagnosing a possible malfunctioning of the radio communication device of said gateway to be tested.

According to an advantageous feature, said newly implemented diagnostic step diagnoses either correct functioning of said radio communication device of the gateway to be tested in the case of reception of at least one response message, or a possible malfunctioning of said radio communication device of the gateway to be tested in the case of absence of reception of a response message.

According to an advantageous feature, said activation step comprises:

a step of selection of a gateway in said set of gateways if the geographical distance that separates it from said gateway to be tested is less than a predetermined distance, a step of checking that the selected gateway is inactive and, if it is, a step of activating said selected gateway, and, if it is not:

a step of transmitting, to said gateway to be tested, a warning message which, on reception, implements a diagnostic step diagnosing a possible malfunctioning of the radio communication device of the gateway to be tested.

According to an advantageous feature, said method comprises a step, implemented by said management system on reception of said control message, of checking that at least one gateway is situated at a distance less than a predetermined distance from said gateway to be tested and, if such is not the case, a step of transmitting to said gateway to be tested a warning message which, on reception, implements a diagnostic step diagnosing a possible malfunctioning of the radio communication device of the gateway to be tested.

According to an advantageous feature, said method comprises a step of deactivating said gateway or gateways that were activated by said management system on the occasion of the implementation of the activation step.

According to an advantageous feature, said transmission step is implemented under the impulse of a triggering step, itself implemented by said gateway arbitrarily, periodically or following an event.

According to an advantageous feature, said method comprises a step, implemented by said management system, for asking said gateway to implement said triggering step.

The present invention also relates to a gateway in a set of gateways managed by a system managing said set, said gateway comprising at least one radio communication device. Said gateway, according to the invention, is characterised in that it comprises:

means for controlling said radio communication device so that it sends a response-request message requesting, of every radio communication device of a neighbouring gateway in said set receiving said message, a response in the form of a response message, means for receiving any response message, and diagnostic means diagnosing correct functioning of said radio communication device in the case of reception of at least one response message by said radio communication device.

According to an advantageous feature, said gateway comprises:

means for transmitting a control message to said management system so that it activates at least one radio communication device of a neighbouring gateway in said set that is estimated to be at a geographical distance from said gateway less than a predetermined distance, if such a gateway exists, and means for receiving a message acknowledging the activation by said management system of a new distant gateway and demanding a new sending of a control message, a new reception and a new diagnosis.

The present invention also relates to a system for managing a set of gateways that is characterised in that it comprises:

means for receiving a control message transmitted from a requesting gateway, activation means for, on reception of a control message by said reception means, activating at least one radio communication device of a gateway in said set that is estimated to be at a geographical distance from said requesting gateway less than a predetermined distance, if such a gateway exists, means for transmitting to said requesting gateway a message acknowledging that the radio communication device of said other gateway has been activated.

The present invention also relates to a computer program loaded into a memory of a control unit of a gateway comprising instructions which, when they are executed by a processor of said control unit, implement a test method as just described.

Finally, the present invention relates to storage means that are characterised in that they store a computer program comprising instructions for implementing, when it is loaded into a memory of a control unit of a gateway and is executed by a processor of said control unit, a method as just described.

Figure 2:
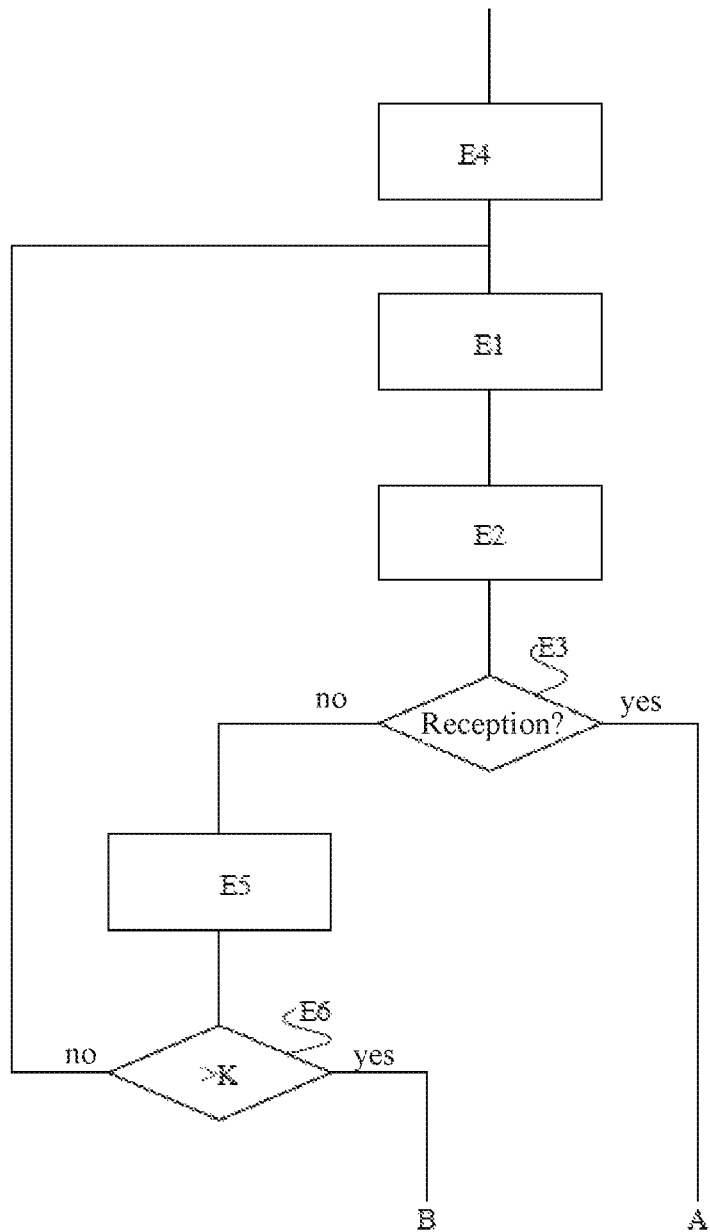
Figure 3:
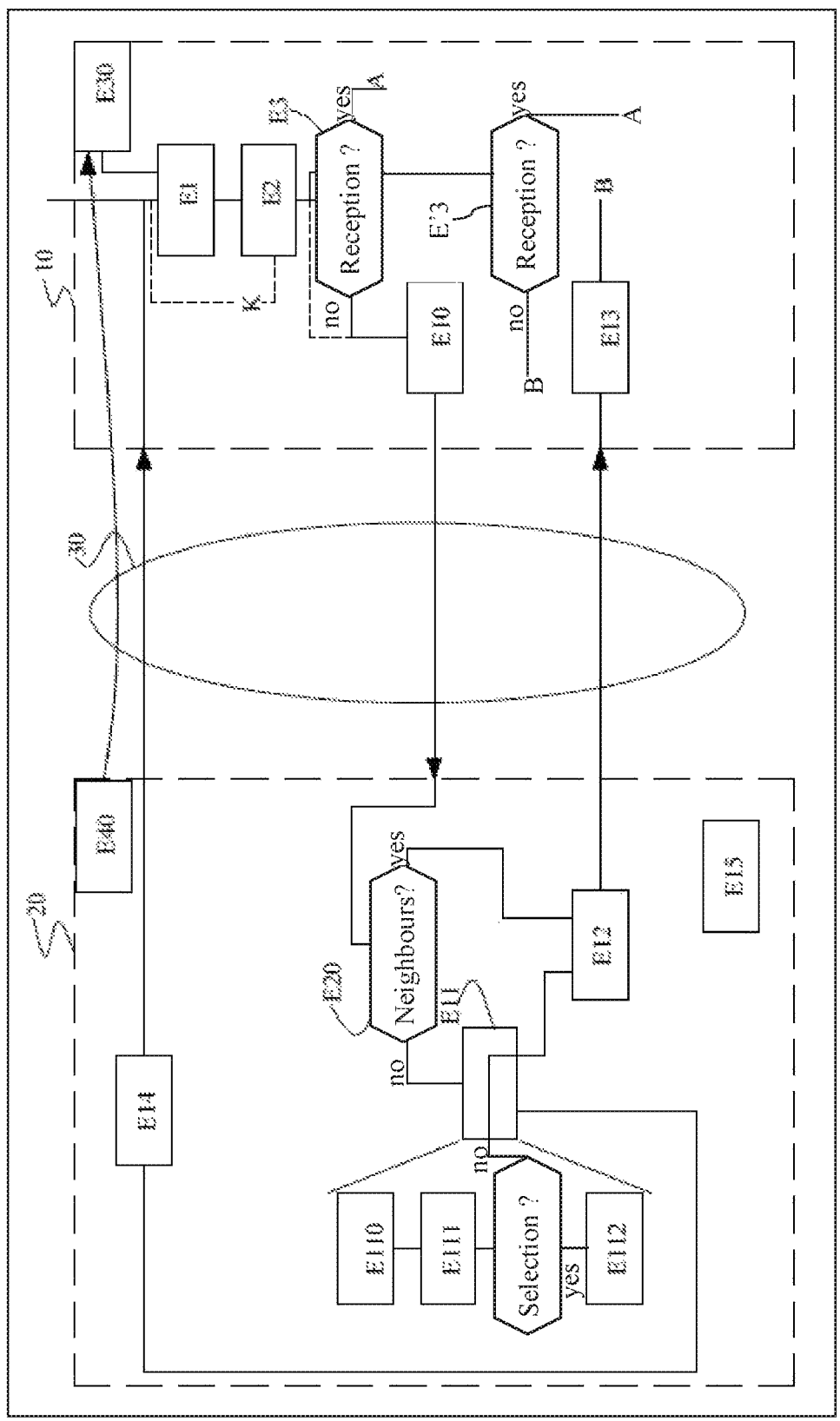
Figure 4:
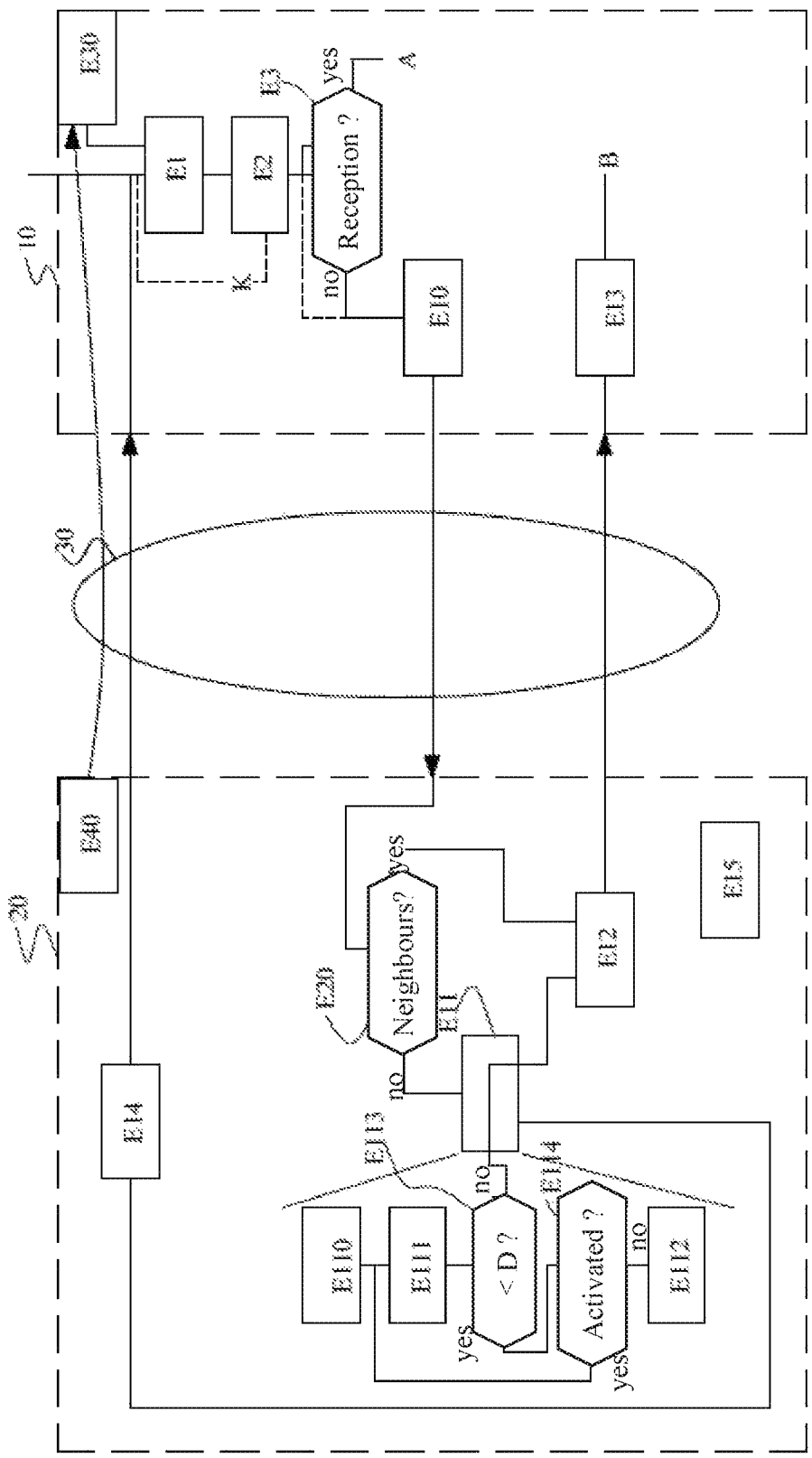
Figure 5:
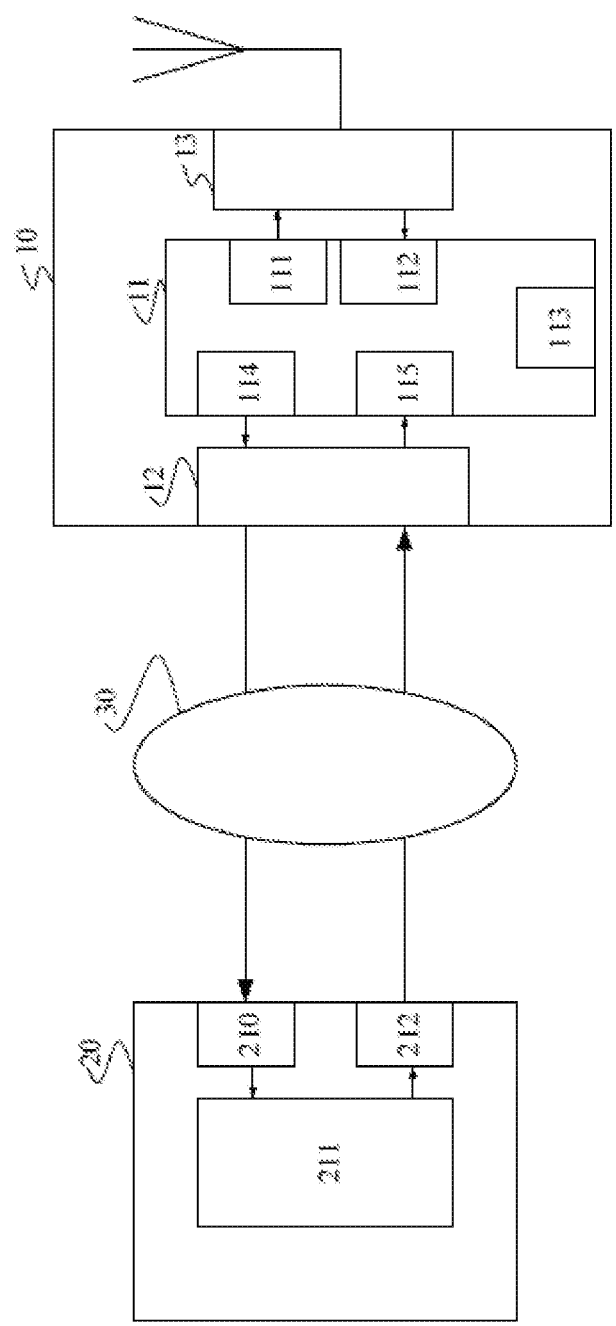

The features of the invention mentioned above, as well as others, will emerge more clearly from a reading of the following description of example embodiments, said description being given in relation to the accompanying drawings, among which:

FIG. 1 is a block diagram of a communication system that includes a set of gateways, at least one of which is in accordance with the present invention, and a system managing said set of gateways, FIG. 2 is a diagram illustrating a first embodiment of a test method according to the present invention, FIG. 3 is a diagram illustrating a second embodiment of a test method according to the present invention, FIG. 4 is a diagram illustrating a third embodiment of a test method according to the present invention, and FIG. 5 is a block diagram of a gateway and of a management system according to the present invention, connected to each other via a network.

FIG. 1 shows a set of N gateways $10_1$ to $10_N$ that are connected, via the same communication network 30, to a system 20 managing the set of gateways in question. The management system 20 may consist of a single server or on the other hand a plurality of servers designed to communicate with each other via a single network or a plurality of networks that may include the communication network 30.

The gateway $10_j$ has been enlarged in order to show the constituents of any gateway relating to the present invention. Thus each gateway 10 comprises a control unit 11 designed, among other things, to control an interface 12, for example of the cabled xDSL, optical fibre or other type, with the network 30 as well as with a radio communication device 13.

The radio communication device 13 is for example of the Wi-Fi type. The Wi-Fi standard relates to a set of communication protocols governed for the ISO/IEC 8802/11 (IEEE 802.11) standards.

This radio communication device 13 enables the gateway 10 concerned to communicate with at least one item of equipment 40, for example a computer as shown, also provided with a radio communication device (not shown).

At the same time as it can communicate with an item of equipment 40, a gateway 10 sends beacon signals enabling an item of equipment 40 to synchronise on said gateway 10 and also to register with this gateway 10. The range of the beacon signals may be fairly high (around a hundred metres) so that the same item of equipment 40 or the same gateway can receive the beacon signals from adjacent gateways, for example in an urban area where around ten gateways may be situated at the same address. Here "gateways adjacent" to an item of equipment 40 or a given gateway 10 means the gateways that are able to receive signals, in particular beacon signals, from said equipment or from said gateway and the signals of which, in particular the beacon signals, that they are liable to send are received by said equipment or by said gateway.

For example, in FIG. 1, the gateway 10, receives the signals sent by the gateway $10_1$ (arrow A). They are therefore adjacent to each other, within the meaning of the present invention. The gateway $10_j$ is able to receive the signals sent by the gateway $10_i$ but, not being activated, it does not actually receive them. Likewise, it is able to send signals to the gateway $10_i$, which would then receive them, but it does not send them, not being activated. This situation is illustrated by arrows B. Despite this situation, the gateways $10_i$ and $10_j$ are considered to be adjacent to each other within the meaning of the present patent. On the other hand, the gateway $10_j$ does not receive the signals sent by the gateway $10_N$ and vice versa. They are not adjacent to each other.

A particular embodiment of a test method according to the present invention is now described in relation to FIG. 2.

This test method comprises a step E1 of the sending, by the radio communication device 13 of the gateway 10 to be tested, of a response-request message requesting, of any radio communication device 13 of a distant gateway in said set receiving said message, a response in the form of a response message. The adjacent gateways that respond to this message are those that are present in the coverage area of the radio communication device 13 of the gateway 10 to be tested and which in addition have their radio communication device active, that is to say functioning. It is therefore a case of active gateways adjacent to the gateway 10 to be tested.

For example, in the case of a radio communication device of the Wi-Fi type, this step E1 consists of implementing an active scanning procedure and thus transmitting on a broadcasting channel a management frame known as a "probe request" associated with suitable parameters. Such a method is in particular used by Wi-Fi peripherals seeking a gateway with which to pair.

Step E1 is generally performed on all the channels available for the use of the radio communication device 13 concerned. For example, in the case of a device of the Wi-Fi type of the 2.4 GHz ISM band, step E1 is performed on each of the thirteen channels.

According to a variant embodiment, said response-request message is such that only adjacent gateways having particular communication characteristics respond thereto. These communication characteristics may be the channel or particular channels used for sending said response-request message, in particular if the characteristics of the adjacent gateways are known. For example also, the response-request message sent at step E1 refers to one or more particular gateways known to be adjacent to the gateway 10 to be tested since, for example, they have in the past already responded to such a message sent by the radio communication device 13 of the gateway 10 to be tested. For example, in the case of a radio communication device of the Wi-Fi type, this message is a "probe request" management frame specifying the SSID network name and/or the channel of each potentially joinable gateway.

All the gateways that receive the response-request message, such as a "probe request" management frame in the case of a Wi-Fi system, if there is one, will respond by in their turn sending a response message which, in the case of a system of the Wi-Fi type, may for example be a so-called "probe response" management frame.

A step E2 is a step of receiving the response message or messages sent by at least one distant gateway sought by the response-request message sent at step E1. More exactly, in order to make the diagnosis reliable and to reduce the effect of any communication errors relating to various external causes, step E2 makes an analysis of each of the channels concerned for a predetermined time t sufficiently long to allow the gateways approached by the response-request message sent by the radio communication device 13 the time to respond thereto.

A step E3 is a diagnostic step that consists of making a diagnosis of the radio communication device 13 of the gateway 10 to be tested.

If at step E2 the radio communication device 13 of the gateway 10 to be tested has received a response message from at least one adjacent gateway and because both its sender and receiver have participated in the execution of steps E1 and E2, this means that the radio communication device 13 is perfectly operational. Step E3 then diagnoses correct functioning of said radio communication device 13 (case A).

The steps of sending E1, reception E2 and diagnosis E3 can be reiterated a certain number K of times (as is the case in FIG. 2) so as to avoid a false diagnosis that could be the consequence of a communication error relating to various external causes. To do this, the method comprises for example a step E4 of initialisation of a counter to the value 0, a step E5 of incrementing said counter at each execution of steps E1, E2 and E3 and a step E6 of checking the value of said counter compared with a maximum number K of executions.

Whether or not steps E4 and E5 allowing reiteration are implemented, in the absence of the reception of response message, in this first embodiment, step E3 diagnoses a possible malfunctioning of the radio communication device 13 of the gateway 10 to be tested so that the gateway 10 to be tested must be returned to the workshop for repair (case B).

Nevertheless, an absence of reception of a response message (for example at the expiry of the time t) is not necessarily caused by a malfunctioning of the radio communication device 13 of the gateway 10 to be tested. In general, an absence of response from a radio communication device 13 of a distant gateway may be caused by one of the following situations.

At least one of the components of the radio communication device 13 of the gateway 10 to be tested is faulty, making any communication inoperative. The gateway 10 to be tested must then be repaired, and therefore be returned to the workshop.

Another cause may be the fact that no distant gateway is actually sufficiently close to the radio communication device 13 of the gateway 10 tested either firstly to receive the response-request message sent by said radio communication device 13 of the gateway 10 to be tested or secondly to enable this radio communication device 13 to receive the response message that any distant gateway may anyway have sent. In this case, no diagnosis is possible since any new execution of steps E1 and E2 will result in a new absence of response. The gateway 10 to be tested will also have to be returned to the workshop for a more detailed analysis.

Another cause may relate to one or more distant gateways that are nevertheless sufficiently close geographically speaking to the radio communication device 13 of the gateway 10 to be tested to receive therefrom the response-request message and to respond thereto, and for which, because they are in a state where no dialogue is possible with the radio communication device 13 of the gateway to be tested, the radio communication device 13 of the gateway 10 has not received a response at its step E2. Consequently these distant gateways are said firstly to be adjacent and secondly to be non-activated. The particular state of these distant gateways may be the consequence of various situations: gateway not powered, instance of concealed wireless network (concealed SSID), use of a filtering of MAC addresses, modulation type not used, etc.)

FIG. 3 shows a second embodiment of the present invention that makes it possible to make a diagnosis in any situations of the latter type where the radio communication device 13 of the gateway 10 to be tested does not receive a response from distant gateways whereas they are sufficiently close geographically speaking to the gateway 10 to be tested for this to be the case.

This embodiment, as will be seen subsequently, takes advantage of the fact that the manager of a set of gateways knows the architecture of his network, particularly the geographical location of each of the gateways in his set. This is because each of these gateways is connected to a physical termination of the network identified (the end being situated in the premises of the subscriber). For example an xDSL-type copper line, or an incoming optical fibre, or an incoming coaxial cable. This physical termination has been installed by the manager of the set or by one of his representatives at a particular geographical address and corresponds in general to the subscription of a subscriber.

When the connection is established between the gateway 10 and the management system 20 for the set, information is exchanged between them, in particular an identification of the subscriber and of the gateway 10. The system 20 managing the set may also simply know the identification of the physical termination of the network that made it possible to establish this network. This information currently available for a set-management system enables it to establish simply a geographical distribution of the gateways in its set.

The test method according to the second embodiment comprises steps that are implemented by the gateway 10, a radio communication device 13 of which is to be tested (these steps are in a box 10 representing this gateway 10) and steps that are implemented by a distant system 20 under the control of a manager of a set of gateways (these steps are in a box 20 representing the distant system, referred to as the system managing the set). The gateway 10 and the management system 20 are in communication with each other via the network 30.

The test method according to this second embodiment comprises steps of sending E1, reception E2 and diagnosis E3 identical to those of the test method according to the first embodiment. In addition these steps can be reiterated a certain number K of times (broken lines framing the letter K in FIG. 3). In the same way as in the first embodiment, the result of the implementation of these steps is a diagnosis at step E3 either of a correct functioning of the radio communication device 13 of the gateway 10 to be tested (case A) if at least one response to the response-request message sent by its radio communication device 13 has been provided by at least one distant gateway, or an absence of response to this message.

It comprises a step E10 of transmitting a control message to the management system 20, for example via the ADSL interface of the gateway 10 to be tested and the network 30 or any other interface with the exception of the one involving the radio communication device 13 to be tested, implemented in the case of a diagnosis of absence of reception of response at step E3. This control message is a message intended for the management system 20 so that it activates at least one radio communication device of at least one adjacent gateway the estimated distance of which to the gateway concerned is less than a predetermined distance. For example, such a message is a management control message of the TR-069 type.

The method also comprises a step E11, implemented by the management system 20 on reception of a control message transmitted by a gateway, in this case the gateway 10 to be tested, for activating a radio communication device of at least one gateway in said set that is estimated to be at a geographical distance from the relevant gateway less than a predetermined distance.

Step E11 may include an estimation step E110, on the basis of the postal address of the physical termination to which the gateway 10 to be tested is connected and that of the physical terminations to which the gateways managed by the gateway-set manager are respectively connected, and the estimated distance that separates said requesting gateway 10 from each gateway in said set.

It also includes a step E111 of selecting the gateways for which this distance is less than a predetermined distance. This predetermined distance is for example an estimated distance of the useful range of a wireless network (a few hundred metres for a 2.4 GHz Wi-Fi network) beyond which it would not be reasonable to hope for any communication. Moreover, for the same postal address, a selection may in the same way be made for example by assessing the distance between two buildings, or between two floors.

It may result from step E111 that no gateway is selected. In this way, the diagnosis cannot be refined and the gateway 10 to be tested must then be returned to the workshop for a more detailed analysis. A step E12 implemented by the management system 20 transmits a warning message to the gateway to be tested 10 in order to warn it of the situation, which, on reception, implements a diagnosis E13 diagnosing a possible malfunctioning of the radio communication device of said gateway (case B).

It may result from step E111 that at least one gateway has been selected. Step E11 also includes a step E112 of activation proper of a radio communication device 13 of the gateway or gateways selected at step E111.

The activation step E112 consists of activating the or at least one of the radio communication devices 13 of a gateway selected so that it is compatible with the radio communication device 13 of the gateway 10 to be tested and so that it can be able to respond to a response-request message coming from the gateway 10 to be tested, in particular by ensuring that at least one instance of a radio communication network present on this radio communication device 13 shares the same protocols, modulations, communication channels, identifiers, etc. as the radio communication device 13 of the gateway 10 to be tested.

A step E14, implemented by the management system 20, transmits an acknowledgement message to the requesting gateway 10 to warn it that new adjacent gateways have been activated.

On reception of an acknowledgement message from the management system 20, the steps of sending E1, reception E2 and diagnosis E3 are once again implemented by the gateway 10 to be tested.

In the present embodiment, the newly implemented diagnosis step (denoted E3' in FIG. 3), if it finds that the radio communication device 13 has received a response message from at least one adjacent gateway, diagnoses correct functioning of said radio communication device to be tested (case A) and if on the other hand, in the contrary case, it finds an absence of reception of a response, it diagnoses a possible malfunctioning of the radio communication device (case B).

A step E15, implemented by the management device 20, consists of deactivating the gateways that the management system 20 had activated on the occasion of the implementation of the activation step E11. Step E15 can be implemented automatically after the expiry of a pre-established period or at the request of the gateway 10 to be tested following the implementation of step E3'.

FIG. 4 shows a variant implementation of the second embodiment of the present invention.

The test method according to this variant implementation comprises steps of sending E1, reception E2 and diagnosis E3 identical to the previous embodiment. In the same way as in the first embodiment, the result of the implementation of these steps is either a diagnosis of a correct functioning of the radio communication device 13 of the gateway 10 to be tested (case A), or an absence of response to the response-request message sent by the radio communication device 13 of the gateway 10 to be tested.

It also comprises a step E10 of transmitting a control message to the management system 20 implemented in the case of diagnosis of an absence of response at step E3.

According to this variant embodiment, an iterative process is established as long as the diagnosis step E3 finds an absence of reception of a response. To do this, unlike the second embodiment described in relation to FIG. 4, step E3, newly implemented after an iteration, is identical to step E3 implemented at the first iteration.

According to this variant embodiment, the selection step E111 consists of selecting the gateway distant from said gateway 10 to be tested which, in increasing order of distances to the gateway 10 to be tested, is situated just after the gateway previously selected (in a previous iteration). The first gateway selected at the first iteration is the one that is closest to the gateway to be tested 10.

A step E113 checks that the distance that separates the gateway selected at step E111 from the gateway 10 to be tested is less than a predetermined distance D. This predetermined distance D is for example an estimated distance of the useful range of a wireless network beyond which it would not be reasonable to hope for any communication.

If such is not the case, this means that there does not exist any adjacent gateway other than those that have already been the subject of an attempt at communication through steps E1 and E2 (as will be seen subsequently). In this case, the diagnosis cannot be refined since the maximum theoretical coverage area of the gateway 10 to be tested has been reached. The gateway 10 to be tested will then have to be returned to the workshop for a more detailed analysis. A step E12 implemented by the distant system 20 transmits a message to the gateway to be tested 10 in order to warn it of the situation, which, on reception, diagnoses case B (step E13).

If such is the case, a step E114 consists of checking whether the gateway selected has a radio communication device 13 that is already activated. If so, it has therefore already been the subject of an attempt at communication corresponding to the implementation of steps E1 to E3 that has remained without any response. In this case, step E111 is once again implemented in order to select one or more new adjacent gateways.

If such is not the case, step E112 is implemented by the distant system 20 in order to activate a radio communication device 13 of the selected gateway. It then leads to a step E14 of transmitting an acknowledgement message and a new iteration is launched on the reception, by the gateway 10 to be tested, of this acknowledgement message.

Step E15 of deactivation of the gateways that the distant system previously activated can be implemented, in this variant embodiment, on reception of the request just before step E11. Or, again, in the way explained for the second embodiment.

According to one or other embodiment according to FIG. 3 or 4, in the acknowledgement message transmitted at step E14, there may be information relating to at least one of the characteristics relating to the adjacent gateway newly selected and activated. This information may relate to the number of the channel used by this selected gateway, or the SSID identification of the network that it forms, its MAC address, etc. The execution of step E1 that follows the execution of step E11 can then be targeted to the networks corresponding to this feature or these features, step E1 requiring a response on the corresponding channel, for example the corresponding identification network, by the gateway with the corresponding MAC address, etc.

In both embodiments, the test method of the invention may comprise a step E20, implemented by the management system 20, of checking that at least one activatable adjacent gateway is situated at a reasonable distance from the gateway 10 to be tested. If such is the case, step E20 leads to step E11. In the contrary case, step E20 leads to step E12.

Implementing this step E20 makes it possible to accelerate the processing of the test method of the invention because it avoids the implementation, which would be unnecessary, of step E11, consuming computing resources, in the case where the gateway 10 to be tested is situated in an area where no gateway other than itself is situated.

Other methods alternative to the one that has been relating to the selection step E111 can be envisaged for selecting one or more adjacent gateways that are most in a position to communicate with a given gateway to be tested.

The method of the present invention may thus comprise a step E30, implemented by any gateway according to the invention, of triggering the step of transmitting a control message E10.

This step E30 may be triggered arbitrarily, periodically, or following any event, for example when a gateway is first installed.

The management system 20 may also comprise a step E40 of requesting implementation of the triggering step E30.

The references of the gateways adjacent to the gateway 10 to be tested, such as the distant gateways selected at step E111, are stored in a database (not shown) in relationship with any gateway 10 which, through its step E10, transmitted a control message to the management system 20. The consequence of this is enabling the system 20 managing the set of gateways to know the actual fine coverage mesh of its network, as well as that of its competitors, and to use this information in particular for implementing the selection step E111 when the test process of the present invention is implemented.

The present invention also relates to a gateway 10 in a set of gateways managed by a system 20 managing said set that is designed to implement a test method according to the present invention. Such a gateway is now described in relation to FIG. 5. It comprises an interface 12 with the network 30 as well as at least one radio communication device 13. It also comprises a control unit 11, which comprises, with regard to the present invention means 111 for controlling said radio communication device 13 so that it sends a response-request message asking of any radio communication device of an adjacent gateway in said set receiving this said message a response in the form of a response message, means 112 for receiving any response message and diagnosis means 113 diagnosing correct functioning of said radio communication device 13 in the case of reception of at least one response message by said radio communication device 13.

In an advantageous embodiment, it also comprises means 114 for transmitting a control message to said management system 20 so that it activates at least one radio communication device of an adjacent gateway in said set that is estimated to be at a geographical distance from said gateway less than a predetermined distance, if such a gateway exists, and means 115 for receiving a message acknowledging the activation of a new distance gateway operated by said management system 20 triggering the control of a new sending of a control message, a new reception and a new diagnosis.

FIG. 5 also shows a management system 20 according to the present invention, it comprises means 210 for receiving a control message transmitted from a requesting gateway, activation means 211 in order, on reception of a control message by said reception means 210, to activate at least one radio communication device of a gateway in said set that is estimated to be at a geographical distance from said requesting gateway less than a predetermined distance, if such a gateway exists, and means 212 for transmitting to said requesting gateway a message acknowledging that the radio communication device of said other gateway has been activated.

According to one embodiment of the control unit 11 of a gateway 10 according to the invention (see the gateway $10_j$ in FIG. 1), it comprises a processor 11P and a memory 11M designed to store a program comprising instructions that can be executed by the processor 11P and to temporarily store data used during the execution of said instructions. It also comprises an interface 112 for controlling the interface 12 to the network 30 and at least one interface 113 for controlling at least one radio communication device 13 (in general, a plurality of interfaces 113 and a plurality of radio communication devices 13 can be provided).

Among the programs stored in the memory 11M is a program the instructions of which, when they are executed by the processor 11P, implement the steps of a test method according to the present invention. This program also constitutes the means 111 to 113, and optionally the means 114 and 115, of FIG. 5.

The present invention also relates to storage means 14, such as a memory card, a CD or a DVD, or even a server accessible via the network 30, which are designed to store a computer program comprising instructions for implementing, when it is loaded in a memory 11M of a control unit 11 of a gateway 10 and is executed by a processor 11P of said control unit 10, the steps of a test method according to the present invention.

The invention claimed is:

1. A method for testing a radio communication device of a gateway to be tested in a set of gateways, wherein said gateway to be tested is connected to a system managing said set of gateways, the method comprising transmitting, with the gateway to be tested, a control message to said management system, activating, with the management system on reception of the control message by the management system, at least one radio communication device of a neighbouring gateway in said set that is estimated to be at a geographical distance from said gateway to be tested less than a predetermined distance, transmitting, with said radio communication device to be tested, a response-request message requesting, of every radio communication device of a gateway in a neighbouring gateway that received said message, a response message, determining whether the response message was received, and diagnosing correct functioning of said radio communication device of the gateway to be tested due to reception of the response message after determining that the response message was received.

2. The test method according to claim 1, wherein said response-request message asks that only adjacent gateways having particular communication characteristics should respond thereto.

3. The test method according to claim 1, wherein said diagnosing correct functioning of said radio communication device of the gateway to be tested diagnoses a possible malfunctioning of said radio communication device of the gateway to be tested due to absence of reception of the response message.

4. The test method according to claim 1, wherein the control message is transmitted after determining that the response message was not received, the method further comprising, on reception of a message acknowledging that the management system has activated at least one radio communication device, transmitting, with said radio communication device of the gateway to be tested, a second response-request message requesting, of every radio communication device of the gateway in the neighbouring gateway that received said message, the response message, determining whether the second response message was received, and diagnosing correct functioning of said radio communication device of the gateway to be tested due to reception of the second response message after determining that the second response message was received.

5. The test method according to claim 4, further comprising:

transmitting a warning message to said gateway to be tested by said management system when no gateway in said set is at an estimated geographical distance from said gateway to be tested less than the predetermined distance, and diagnosing, by said gateway to be tested, a possible malfunctioning of the radio communication device of said gateway to be tested on reception of said warning message.

6. The test method according to claim 4, wherein the diagnosing correct functioning of said radio communication device due to reception of the second response message diagnoses correct functioning of said radio communication device of the gateway to be tested when the second response message was received, and diagnoses a possible malfunctioning of said radio communication device of the gateway to be tested when the second response message was not received.

7. The test method according to claim 1, wherein said activating, with the management system, at least one radio communication device comprises:

selecting a gateway in said set of gateways where the geographical distance that separates the gateway in said set of gateways from said gateway to be tested is less than the predetermined distance, determining whether the selected gateway is inactive, activating said selected gateway when the selected gateway is determined to be inactive, and, transmitting, to said gateway to be tested when the selected gateway is determined to be active, a warning message which, on reception, implements diagnosis of a possible malfunctioning of the radio communication device of the gateway to be tested.

8. The test method according to claim 1, wherein said management system, on reception of said control message, determines that at least one gateway is not situated less than the predetermined distance from said gateway to be tested and transmits a warning message to said gateway to be tested which, on reception, diagnoses a possible malfunctioning of the radio communication device of the gateway to be tested.

9. The test method according to claim 1, further comprising deactivating the gateway or gateways that have been activated by said management system.

10. The test method according to claim 1, wherein said transmitting the response-request message is implemented by said gateway to be tested arbitrarily, periodically or following an event.

11. The test method according to claim 1, wherein said management system requests said gateway to transmit the response-request message.

12. A gateway comprising
a radio communication device; and
a controller configured to:
cause the gateway to be tested to transmit a control message to said management system,
activate, with the management system on reception of the control message by the management system, at least one radio communication device of a neighbouring gateway in said set that is estimated to be at a geographical distance from said gateway to be tested less than a predetermined distance,
control said radio communication device to send a response-request message requesting a response message from every radio communication device of a neighbouring gateway in a set of gateways receiving said message,
determine whether the response message was received, and
diagnose correct functioning of said radio communication device due to reception of the response message by said radio communication device.

13. The gateway according to claim 12, wherein the controller is configured to
control the radio communication device to transmit a control message to a management system managing the set of gateways so that the management system activates at least one radio communication device of a neighbouring gateway in said set that is estimated to be at a geographical distance from said gateway less than a predetermined distance, and
determine receipt of a message acknowledging the at least one radio communication device was activated by said management system and control the radio communication device to transmit a request for a second response message, determine whether the second response message was received and diagnose correct functioning of said radio communication device due to reception of the second response message.

14. A system for managing a set of gateways, the system comprising:
a receiver configured to receive a control message transmitted from a requesting gateway in the set of gateways,
a controller configured to, on reception of the control message by the receiver, activate at least one radio communication device of another gateway in said set that is estimated to be at a geographical distance from said requesting gateway less than a predetermined distance, and a transmitter configured to transmit a message acknowledging that the radio communication device of the other gateway has been activated.

15. A non-transitory storage medium storing executable instructions that cause a control unit of a gateway to execute the method according to claim 1.

* * * * *